(12) United States Patent
Stieff et al.

(10) Patent No.: US 8,561,307 B2
(45) Date of Patent: Oct. 22, 2013

(54) METHOD AND APPARATUS FOR VEHICLE SERVICE SYSTEM OPTICAL TARGET ASSEMBLY

(71) Applicant: Hunter Engineering Company, Bridgeton, MO (US)

(72) Inventors: Michael T. Stieff, Wentzville, MO (US); Dennis M. Linson, St. Charles, MO (US); Daniel R. Dorrance, Ballwin, MO (US); Thomas J. Golab, St. Peters, MO (US); Mark S. Shylanski, University City, MO (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

(21) Appl. No.: 13/693,750

(22) Filed: Dec. 4, 2012

(65) Prior Publication Data
US 2013/0250098 A1    Sep. 26, 2013

Related U.S. Application Data

(63) Continuation of application No. 12/875,796, filed on Sep. 3, 2010, now Pat. No. 8,341,848, which is a continuation-in-part of application No. 12/720,453, filed on Mar. 9, 2010, now Pat. No. 7,930,834, which is a continuation of application No. 12/172,554, filed on Jul. 14, 2008, now Pat. No. 7,703,212, which is a continuation of application No. 11/535,881, filed on Sep. 27, 2006, now Pat. No. 7,444,752, said application No. 12/720,453 is a continuation-in-part of application No. 12/120,460, filed on May 14, 2008, now Pat. No. 7,810,244.

(60) Provisional application No. 60/938,947, filed on May 18, 2007, provisional application No. 60/721,206, filed on Sep. 28, 2005.

(51) Int. Cl.
*G01B 11/275* (2006.01)
*G01B 5/255* (2006.01)

(52) U.S. Cl.
USPC ............. 33/203.18; 33/288; 356/139.09

(58) Field of Classification Search
USPC ............ 33/203, 203.18, 203.19, 203.2, 288; 356/139.08, 155, 620, 615, 623; 382/104, 152, 154, 286, 287
See application file for complete search history.

(56) References Cited

U.S. PATENT DOCUMENTS 3,910,533 A   10/1975   Cheatham et al.
5,535,522 A    7/1996   Jackson (Continued)

FOREIGN PATENT DOCUMENTS

DE   102008042024 A1   3/2010
EP        0806629 A   11/1997

(Continued)

OTHER PUBLICATIONS

Hartley et al., "Multiple View Geometry in Computer Vision, Second Edition", Cambridge University Press, Third Printing, 2006. Selected pages, including cover page, title page, table of contents, and Chapter 7, consisting of pp. 178-194. (26 Pages Total).

(Continued)

*Primary Examiner* — R. A. Smith
(74) *Attorney, Agent, or Firm* — Polster Lieder Woodruff & Lucchesi, L.C.

(57) ABSTRACT

A method and apparatus for determining the alignment of a vehicle wheel using an optical target assembly secured to the vehicle wheel in a non-determined position, the optical target assembly having a dimensionally stable shape and a plurality of optical target elements disposed on a plurality of target surfaces. Images of the optical target elements are acquired by an imaging system, together with target identifying indicia, and utilized together with previously stored target characterization data to determine a spatial orientation of the optical target assembly and an alignment of the vehicle wheel onto which it is secured.

13 Claims, 9 Drawing Sheets

(56) References Cited

U.S. PATENT DOCUMENTS

| | | | |
|---|---|---|---|
| 5,886,781 A * | 3/1999 | Muller et al. | 356/139.09 |
| 6,148,528 A | 11/2000 | Jackson | |
| 6,370,455 B1 | 4/2002 | Larson et al. | |
| 6,384,907 B1 | 5/2002 | Gooch | |
| 6,483,577 B2 | 11/2002 | Stieff | |
| 6,526,665 B2 | 3/2003 | Jackson | |
| 6,600,555 B2 | 7/2003 | McClenahan | |
| 6,697,761 B2 | 2/2004 | Akatsuka et al. | |
| 6,839,972 B2 | 1/2005 | Jackson et al. | |
| 6,894,771 B1 | 5/2005 | Dorrance et al. | |
| 6,973,202 B2 | 12/2005 | Mostafavi | |
| 7,953,247 B2 | 5/2011 | Kassouf et al. | |
| 8,341,848 B2 * | 1/2013 | Stieff et al. | 33/203.18 |
| 2003/0063292 A1 | 4/2003 | Mostafavi | |
| 2003/0187610 A1 | 10/2003 | Dorrance et al. | |
| 2006/0090356 A1 | 5/2006 | Stieff | |
| 2006/0152711 A1 | 7/2006 | Dale, Jr. et al. | |
| 2007/0267498 A1 | 11/2007 | Marsh et al. | |
| 2008/0289202 A1 | 11/2008 | Kassouf et al. | |
| 2010/0166255 A1 * | 7/2010 | Strege et al. | 382/100 |
| 2011/0051151 A1 * | 3/2011 | Dorrance et al. | 356/620 |
| 2011/0146089 A1 | 6/2011 | Gray et al. | |
| 2011/0185584 A1 | 8/2011 | Kassouf et al. | |
| 2012/0170811 A1 | 7/2012 | Kassouf et al. | |

FOREIGN PATENT DOCUMENTS

| | | |
|---|---|---|
| EP | 1422496 A1 | 5/2004 |
| EP | 1717547 A1 | 2/2006 |
| JP | 2002090118 A | 3/2002 |
| JP | 2010216969 A | 9/2010 |
| WO | 0146909 A1 | 6/2001 |
| WO | 0223121 A1 | 3/2002 |
| WO | 0297362 A1 | 12/2002 |
| WO | 2007124010 A2 | 11/2007 |
| WO | 2008143614 A1 | 11/2008 |

OTHER PUBLICATIONS

Oliver Faugeras, "Three-Dimensional Computer Vision—A Geometric Viewpoint", The MIT Press, Cambridge, Massachusetts, Third Printing, 1999. Selected pages, including cover page, title page, table of contents, and pp. 230-240. (19 Pages Total).

VTT Automation, "Machine Vision News, Machine Vision projects at VTT Automation, Machine Automation", vol. 5, 2000, reprinted from http://www.automaatioseura.fi/jaostot/mvn/mvn5/vttautomation.html. (4 Pages Total).

* cited by examiner

METHOD AND APPARATUS FOR VEHICLE SERVICE SYSTEM OPTICAL TARGET ASSEMBLY

CROSS-REFERENCE TO RELATED APPLICATIONS

The present application claims priority from, and is a continuation of, co-pending U.S. patent application Ser. No. 12/875,796 filed on Sep. 3, 2010, which in turn is a continuation-in-part of, and claims priority to, U.S. patent application Ser. No. 12/720,453 filed on Mar. 9, 2010, now U.S. Pat. No. 7,930,834. The '453 application is in turn a continuation of U.S. patent application Ser. No. 12/172,554 filed on Jul. 14, 2008, now U.S. Pat. No. 7,703,312, which in turn is a continuation of U.S. patent application Ser. No. 11/535,881 filed on Sep. 27, 2006, now U.S. Pat. No. 7,444,752. The '752 patent is further related to, and claims priority from, U.S. Provisional Patent Application Ser. No. 60/721,206 filed on Sep. 28, 2005.

The '453 application is further a continuation-in-part of, and claims priority to, U.S. patent application Ser. No. 12/120,460 filed on May 14, 2008, now U.S. Pat. No. 7,810,244. The '460 application is in turn a continuation-in-part of the aforementioned '881 application, and claims priority from U.S. Provisional Patent Application Ser. No. 60/938,947 filed on May 18, 2007.

Each of the aforementioned applications and patents is herein incorporated by reference.

STATEMENT REGARDING FEDERALLY SPONSORED RESEARCH

Not Applicable.

BACKGROUND OF THE INVENTION

The present invention relates to machine vision vehicle service systems, and in particular to an optical target assembly configured for mounting to a surface of a vehicle, such as a vehicle wheel, during a machine-vision vehicle wheel alignment procedure.

A machine-vision vehicle service system, such as a vehicle wheel alignment system like the Series 811 Wheel Alignment System utilizing the DSP 600 Series sensors, manufactured and sold by Hunter Engineering Company of Bridgeton, Mo., consists generally of a console having a computer or processing unit, one or more display devices such as a monitor, and one or more input devices such as a keyboard. In a machine-vision vehicle wheel alignment system, one or more imaging sensor arrays are mounted away from a vehicle undergoing an alignment inspection, and are configured to obtain images of alignment targets or other identifiable features associated with the vehicle for communication to the processing unit. Correspondingly, the processing unit is configured with one or more software applications, at least one of which is adapted to facilitate the alignment of vehicle wheels which generally consist of a rim and an associated tire, using input received from the imaging sensors.

The machine-vision imaging sensors are traditionally part of a camera system or imaging system configured to view optical targets within associated fields of view to obtain images thereof for processing by the software applications in the console. Commonly, the observed optical targets incorporate highly accurate patterns that have known control features. The three-dimensional positions and relationships of the features in the images are determined, and the orientation of the wheels or other vehicle components to which the optical targets are attached are calculated by well known algorithms. Exemplary configurations for the high-accuracy optical targets are described in U.S. Pat. No. 6,064,750 to January, and in U.S. Pat. No. 6,134,792 to January. Each exemplary optical target consists of a target face, on which are disposed identifiable optical elements, a precision flat base, and a mounting shaft adapted for attachment to a separate clamping assembly secured to the vehicle or vehicle wheel assembly.

The conventional configuration for an optical target is precisely engineered with high-contrast optical elements such as circles, squares, or triangles. The accuracy of such conventionally configured optical targets is dependant upon how well the high contrast edges of the optical target elements can be located in an image produced by the imaging components of the wheel alignment system. For the best accuracy, the individual optical elements must be large enough to have relatively long straight or curved boundaries, and they must be separated far enough to prevent the individual optical target elements from appearing to fuse into a single object when reduced edge sharpness causes two or more optical target elements to bleed into the same pixel in the imaging system. These factors combine to limit the number of individual image pixels generated by the imaging system whose values are utilized to calculate a position and orientation of a conventionally configured optical target.

Each image of a conventional high-contrast optical target acquired by the optical imaging vehicle wheel alignment system is processed to identify a number of reference points in the image. Either the computer or the imaging system is configured to mathematically manipulate the positional relationships of the observed reference points, as identified in an image, to match them with a set of predetermined positional relationships based on the known parameters of the conventional high-contrast optical target. Once the relationship between the observed positional relationships and the predetermined positional relationships is identified for the reference points, the position and orientation in three-dimensional space of the target (and an associated vehicle wheel) relative to the position and orientation of the imaging system is identified, from which one or more vehicle wheel alignment angles can be identified. Accordingly, for an optical imaging vehicle wheel alignment system to function, it is necessary for the system to be capable of extracting a set of control or reference points from acquired images.

To further facilitate the operation of a machine vision vehicle wheel alignment system, the separate optical targets are secured to the vehicle wheels with precision wheel adaptors configured to clamp onto the vehicle wheel edges and to position a mounting point for the optical target substantially coaxial with the wheel rim's axis of rotation. The traditional precision wheel adaptors typically include a set of claws or feet adapted to secure the wheel adaptor to the vehicle wheel assembly by engaging the lip or rim of the wheel rim at the tire junction. A centering mechanism on the wheel adaptor ensures that the claws or feet of the wheel adaptor are adjusted in a symmetrical manner to maintain the mounting point for the optical target in a determined centered configuration in relation to the axial center of the wheel rim.

Some variations of traditional wheel adaptors, such as the Tire Clamp Adaptor Model No. 20-1789-1 from Hunter Engineering Co., and those shown in U.S. Pat. No. 5,987,761 to Ohnesorge and U.S. Pat. No. 6,131,293 to Maioli et al. further utilize a set of gripping arms adapted to engage tire surfaces in conjunction with a set of contact supports and centering mechanisms for symmetrically engaging the circumferential lip of the wheel rim and securing the wheel adaptors in an axially centered position on the vehicle wheel assembly.

Other vehicle-specific wheel adaptors, such as those for use with Mercedes Benz and BMW automobiles, are configured with a set of pins which are designed to pass through the wheel assembly, and to contact predetermined surfaces on the vehicle wheel hubs, positioning the vehicle-specific wheel adaptor in a predetermined axially centered location about the wheel assembly. These vehicle specific wheel adaptors are then held in place by means of tire clamps or spring mechanisms which grip to the tire tread surfaces.

Traditional wheel adaptors that will universally adapt to the wide range of wheel sizes on the market today are difficult to design and costly to build. Many times additional parts are required, such as extenders, in order to allow the adaptor to work with wheels that are very small or very large which also adds additional cost and complication to the adaptor system. Additionally, traditional adaptors have to provide a substantial amount of clamping force in order to hold the weight of the target or sensor on the wheel assembly. This clamping force can scratch or dent the wheel assembly where it is attached. This is very undesirable especially when the wheel assembly is a very costly aftermarket wheel.

Accordingly, it would be advantageous to provide a machine vision vehicle service system, such as a wheel alignment system, with an optical target assembly which incorporates both an optical target and a simplified adaptor for attachment the optical target assembly to a vehicle wheel, and which does not require a determined precision mounting on the vehicle wheel assembly in relation to the wheel axis of rotation.

It would be further advantageous to provide a machine vision vehicle wheel alignment system with a mechanically simplified optical target assembly which is light weight, dimensionally stable, less abrasive to the wheel rim surfaces, and which does not require precision construction.

BRIEF SUMMARY OF THE INVENTION

Briefly stated, the present disclosure provides a machine vision vehicle wheel alignment system optical target assembly which incorporates an adaptor for attachment of an optical target to a vehicle wheel assembly. The adaptor includes at least one contact surface for seating in a non-determined position against surfaces of a vehicle wheel assembly, and a pair of clamping arms configured to grip the tread surfaces of a tire mounted to the wheel rim, to hold the optical target assembly in contact with the wheel assembly surfaces. The optical target is secured to the adaptor, and maintained in a stationary relationship to the wheel assembly thereby during a vehicle wheel alignment procedure.

In an alternate embodiment, the present disclosure provides a machine vision vehicle wheel alignment system optical target assembly consisting of a rigid body supporting a target identification marking and at least two non-determined optical targets on associated discrete surfaces for temporary attachment to a vehicle wheel assembly. The optical target assembly includes at least one contact surface for seating in a non-determined position against a surface of a vehicle wheel assembly, and a pair of clamping arms configured to grip the tread surfaces of a tire mounted to the wheel rim, to hold the optical target assembly in contact with the wheel assembly surface. The optical targets are adjustably secured to the rigid body in a selected rotational orientation, and maintained in a stationary relationship to the wheel assembly onto which the rigid body is mounted during a vehicle wheel alignment procedure.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In order to fully describe the apparatus and methods of the present disclosure, the following terms and definitions will be utilized in reference to a vehicle wheel assembly. The term "inboard surface" refers to the surface of an object, disposed on the axis of rotation of a vehicle wheel, which is facing the point of intersection between the axis of rotation and the centerline of the vehicle on which the wheel is mounted. The term "inboard direction" refers to movement along a wheels axis of rotation towards a point of intersection between the axis of rotation and the centerline of the vehicle. The terms "outboard surface" and "outboard direction" refer to the opposite surfaces and movement in the opposite direction from the inboard surface and direction. Based on these definitions, it will be readily understood that an object can be described as being "inboard" or "outboard" from another object relative to a defined axis.

Figure 2:
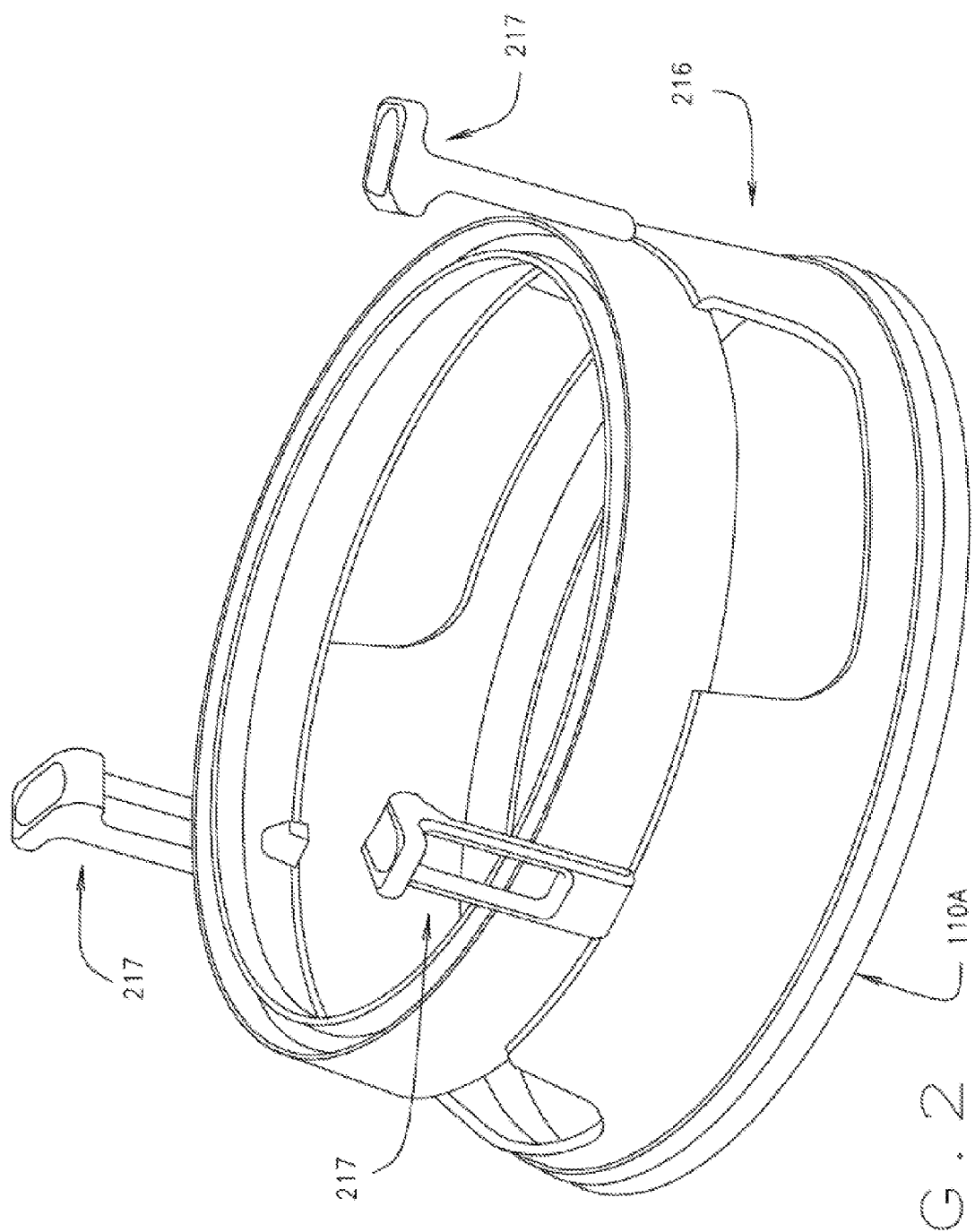
FIG. 2 is a perspective view of a base extender ring for use when mounting the optical target assembly of FIG. 1 to a deep-dish vehicle wheel assembly.
Figure 3:
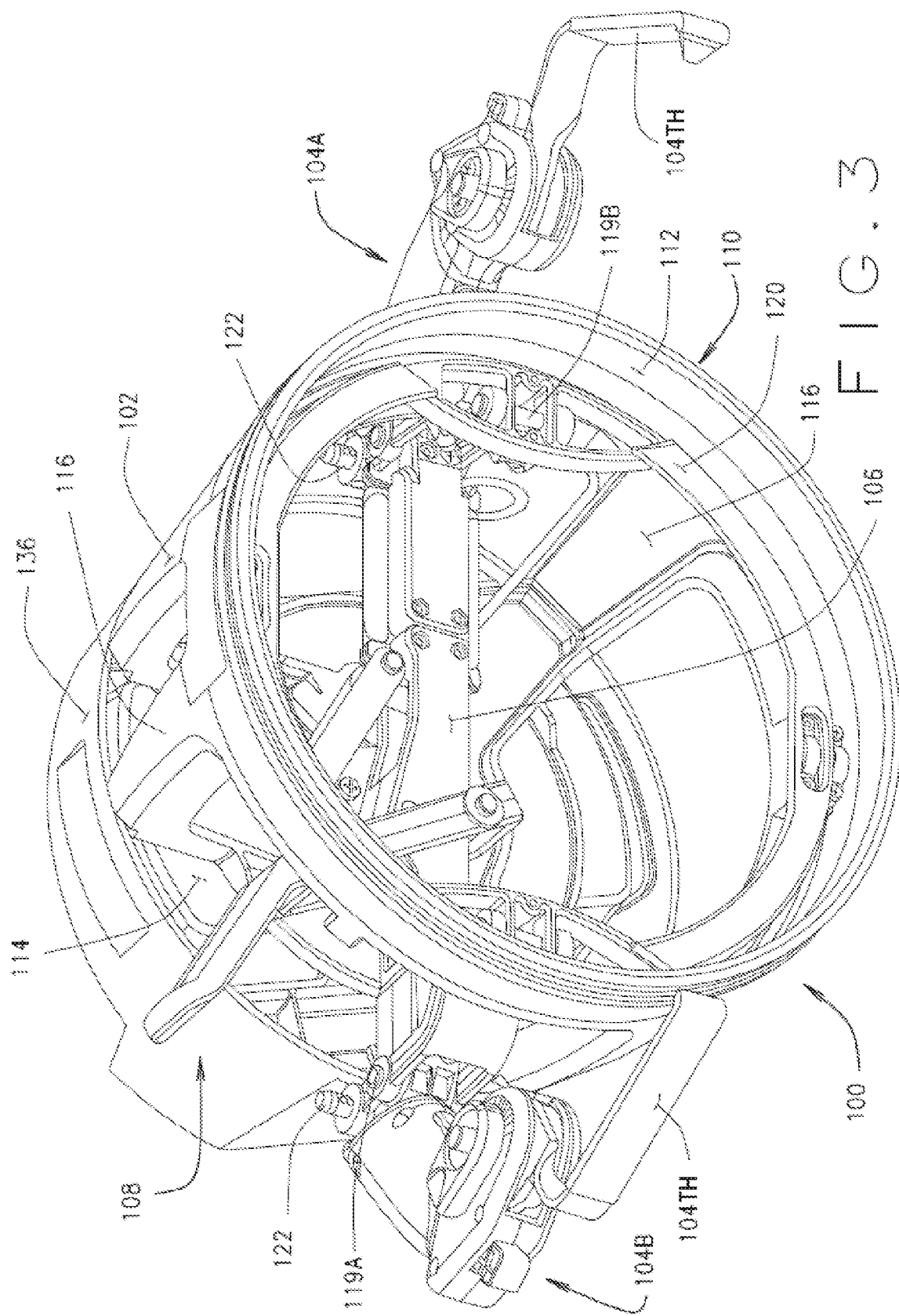
FIG. 3 is a perspective back-right view the embodiment of FIG. 1.
Figure 4:
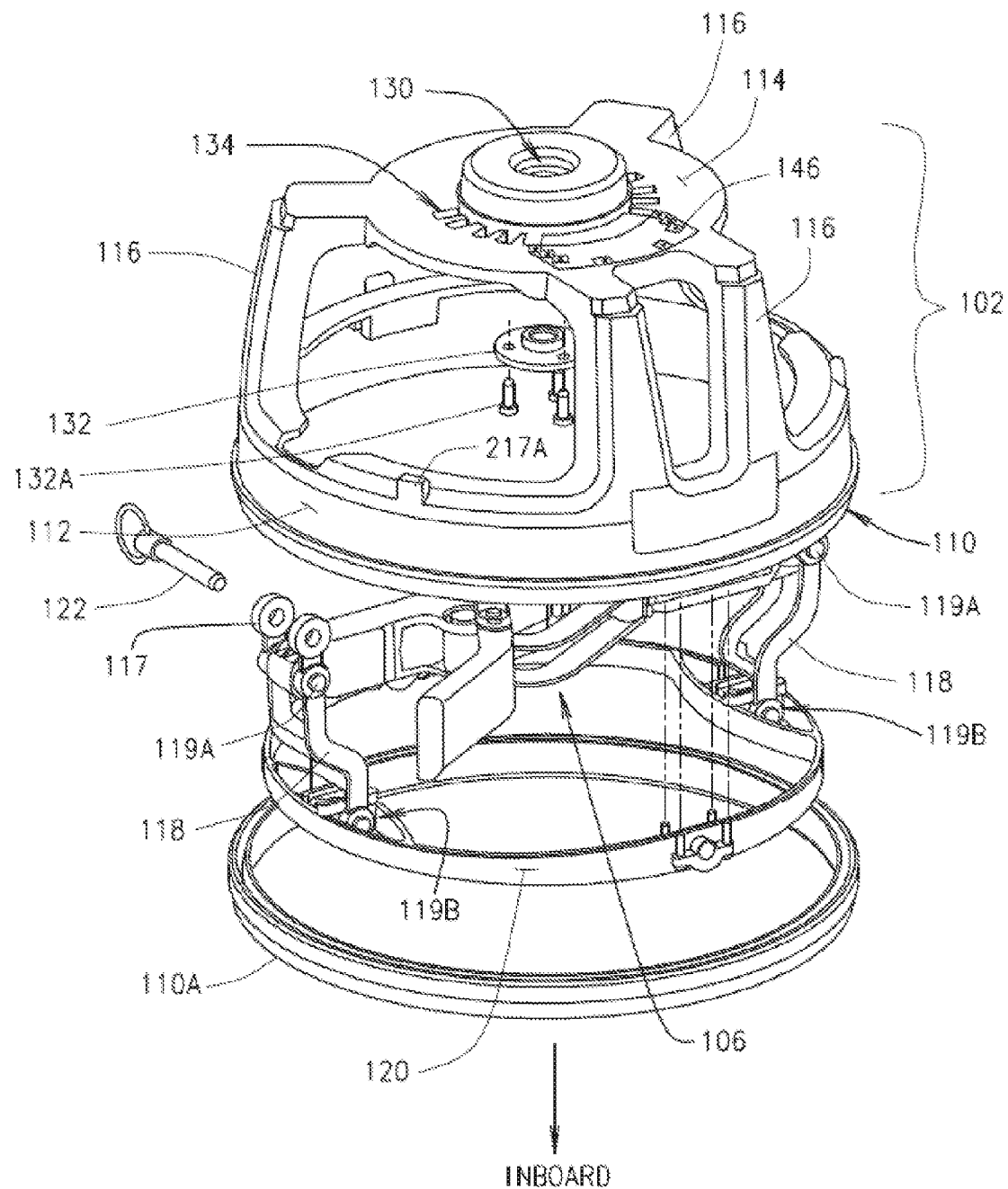
FIG. 4 is an exploded perspective view of the rigid base of the optical target assembly of FIG. 1, with the wheel clamp arms removed.

Turning to FIGS. 1 through 5, an embodiment of the optical target assembly 100 of the present invention is shown in front left and right perspective views. The optical target assembly 100 consists of a generally cylindrical base assembly 102, a pair of opposed wheel clamp arms 104A and 104B coupled to a tension and locking mechanism 106 mounted to the base assembly 102, and a target support assembly 108 coupled to an outboard end of the base assembly 102. The opposite (inboard) end of the base assembly 102 defines an annular contact surface 110 adapted for abutting contact with the generally vertical outer surfaces of a vehicle wheel rim 10, in a non-determined placement between the outer circumferential lip of the wheel rim and the wheel assembly axis of rotation. The contact surface 110 is preferably in the form of a ring, and may optionally be covered with a removable or replaceable protective covering 110A of a pliable or conforming material, such as a rubber or other soft compound, as seen in FIG. 4, which aids in preventing damage to the wheel rim surfaces during use, as well as to provide increased friction there between.

Figure 1:
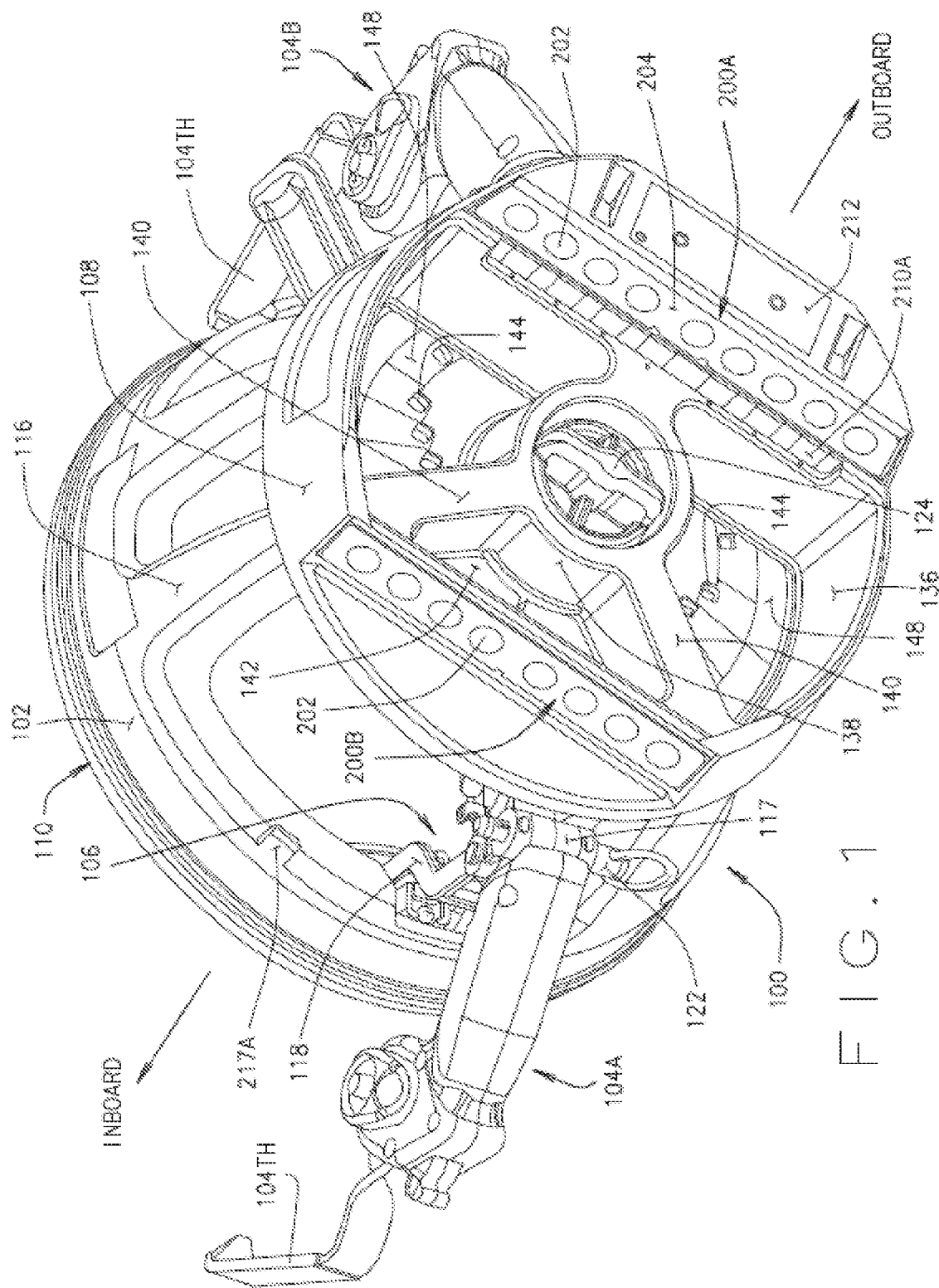
FIG. 1 is a perspective front-left view of an embodiment of the optical target assembly of the present invention configured with adjustable tire hook arms.
Figure 6:
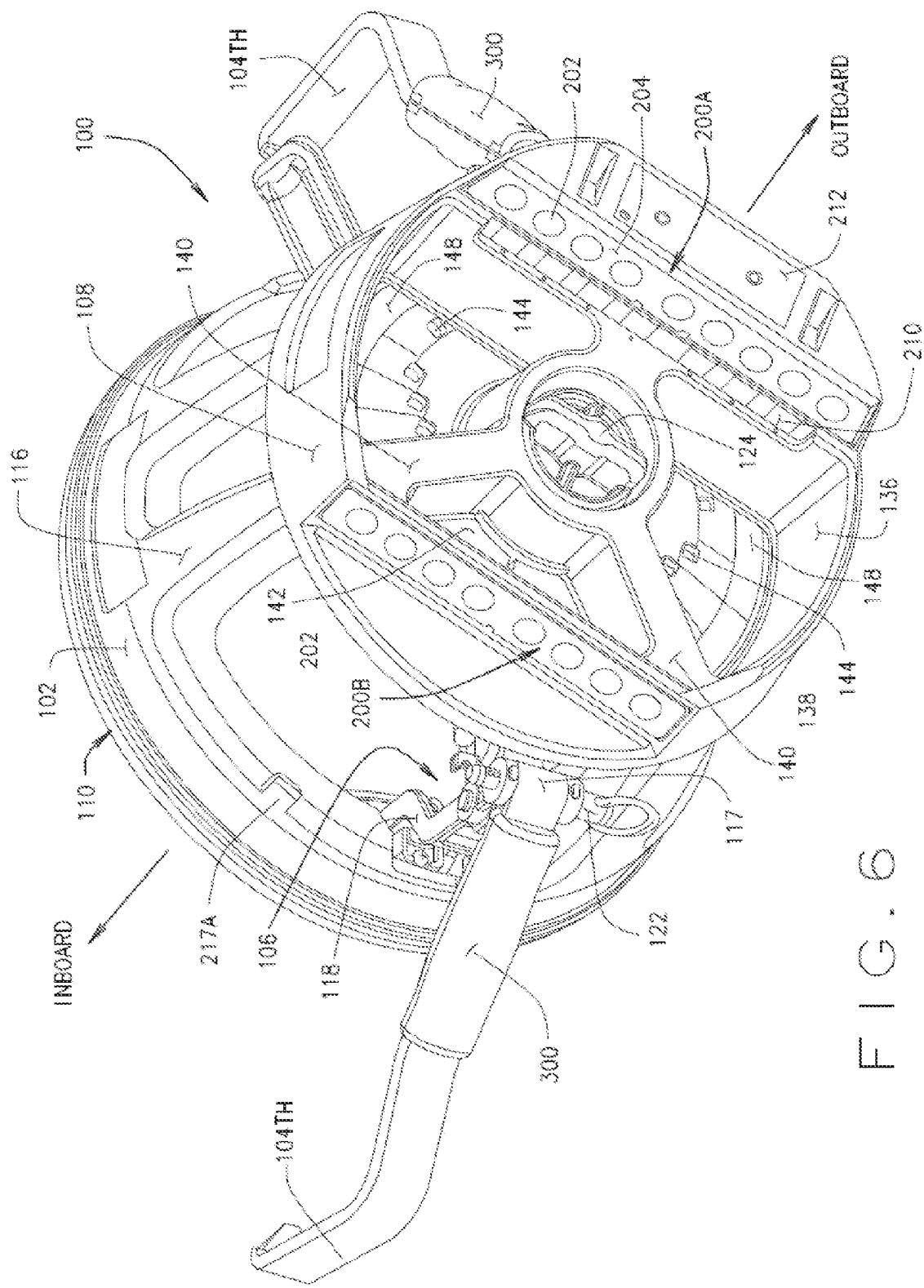
FIG. 6 is a perspective front-left view of an embodiment of the optical target assembly of the present invention configured with fixed tire hook arms.

As best seen in FIG. 4, the base assembly 102 consists generally of a annular base 112 defining the contact surface 110, and a target pivot mount 114 coupled to the annular base 112 opposite from the contact surface 110 by a connecting web of support struts 116. The tension and locking mechanism 106 is pivotally mounted on a pair of double-pivoting supports 118 at pivot points 119A, which in turn are secured to diametrically opposite pivot points 119B on a mounting ring 120 fitted within the inner diameter of the annular base 112. Preferably, each of the opposed wheel clamp arms 104A and 104B are detachable from the tension and locking mechanism 106, such as by the removal of a quick-release pin 122 from pivot couplings 117, allowing for replacement and/or exchange of the wheel clamp arms 104A, 104B as required. The wheel clamp arms 104A and 104B as shown in FIGS. 1 and 3 have an adjustable configuration, and may be adjusted longitudinally by extension or retracting. In alternate configurations 300, such as shown in FIG. 6, the wheel clamp arms are non-adjustable, and cannot be either extended or retracted.

Since the base assembly 102 of the present invention is intended for a non-determined placement against the wheel assembly surface, the base assembly 102 does not require or include any adjustment mechanisms for centering the contact surfaces 110 relative to either the wheel rim circumferential lip or axis of rotation, such as those commonly found in self-centering or adjustable wheel adaptors.

Those of ordinary skill in the art will recognize that the specific configuration of the tension and locking mechanism 106, as well as the wheel clamp arms 104A and 104B may be varied from that which is shown in the accompanying figures. Any suitable mechanism capable of mechanical adjustment to engage the surfaces of a tire mounted to a vehicle wheel rim upon which the optical target assembly 100 is to be mounted, and which is further capable of providing a releasable clamping and/or tensioning force, such as by means of a combination of springs, levers, such as shown in the parent application U.S. Patent Application Publication No. 2008-0209744 A1 to Stieff et al, may be utilized without departing from the scope of the present disclosure.

Figure 5:
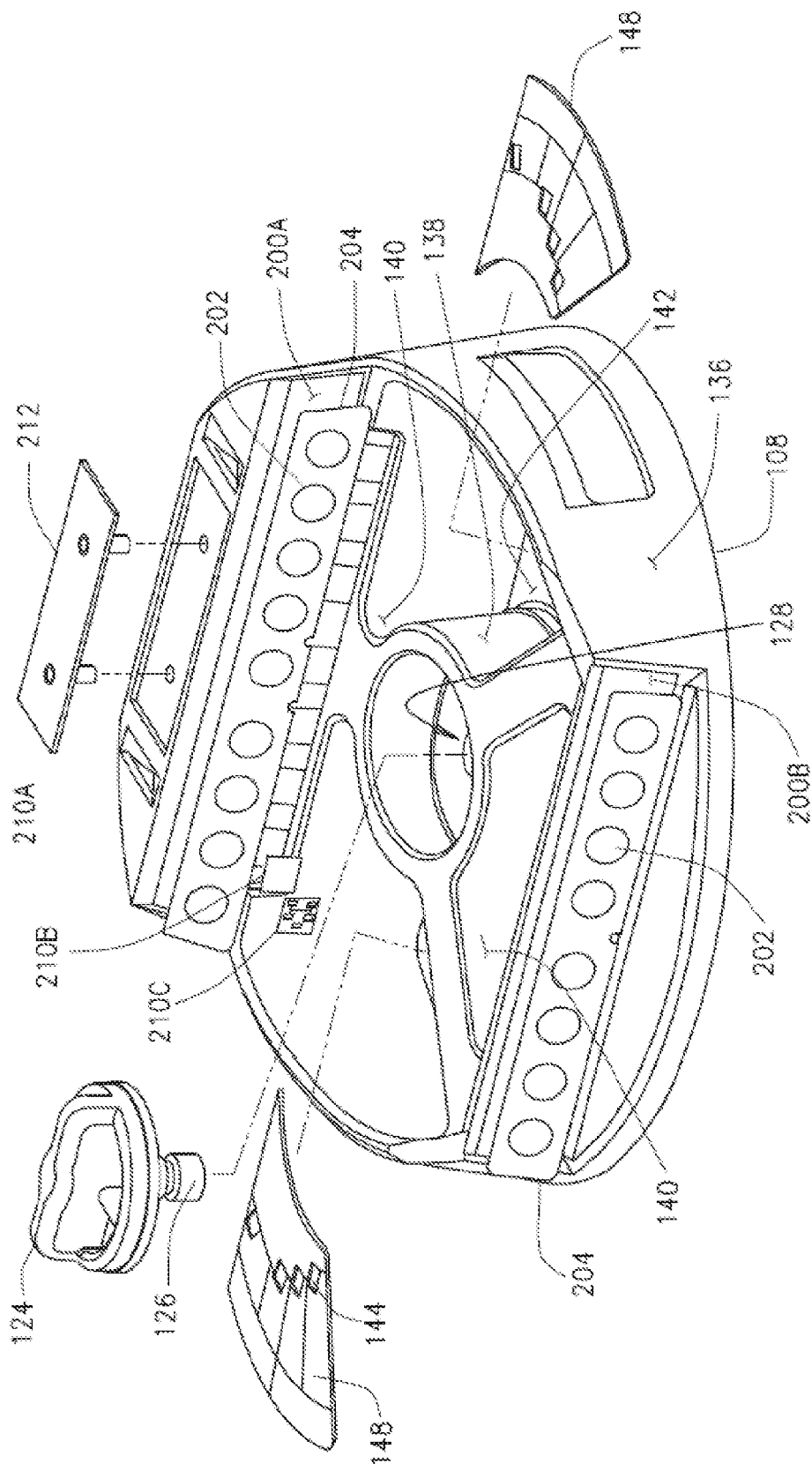
FIG. 5 is an exploded front-left perspective view of the optical target support element of the assembly of FIG. 1.

The target pivot mount 114 at the axial end of the base assembly 102 provides a mounting surface for the target support assembly 108, shown in FIG. 5, or for an optional conventional sensor assembly having a suite of conventional wheel alignment sensors capable of measuring spatial orientation and/or rotation. For embodiments utilizing optical targets, the target support assembly 108 is axially coupled to the target pivot mount 114 by a retainer 124 having a shaft 126 which passes through an axial bore 128 in the target support assembly 108, through an aligned axial bore 130 in the target pivot mount 114, and is engaged with a retention plate 132 secured axially to the rear of the target pivot mount 114 by a plurality of bolts 132A. Various rotational positions of the target support assembly 108 relative to the target pivot mount 114 may be selected by loosening the retainer 124, rotating the target support assembly 108 to a desired rotational position, and then re-tightening the retainer 124 to secured the target support assembly. Optionally, a plurality of predetermined rotational positions may be provided with positive stops or detents 134 on the upper surface of the target pivot mount 114, as seen in FIG. 4, for engaging one or more suitable tabs (not shown) on the underside of the target support assembly 108.

For some embodiments, it will be recognized by those of ordinary skill in the art that the target pivot mount 114 and the target support assembly 108 may be replaced by a target support assembly directly integrated into the axial end of the base assembly 102 in a rigid configuration, without the ability to rotate between various rotational positions.

Figure 9:
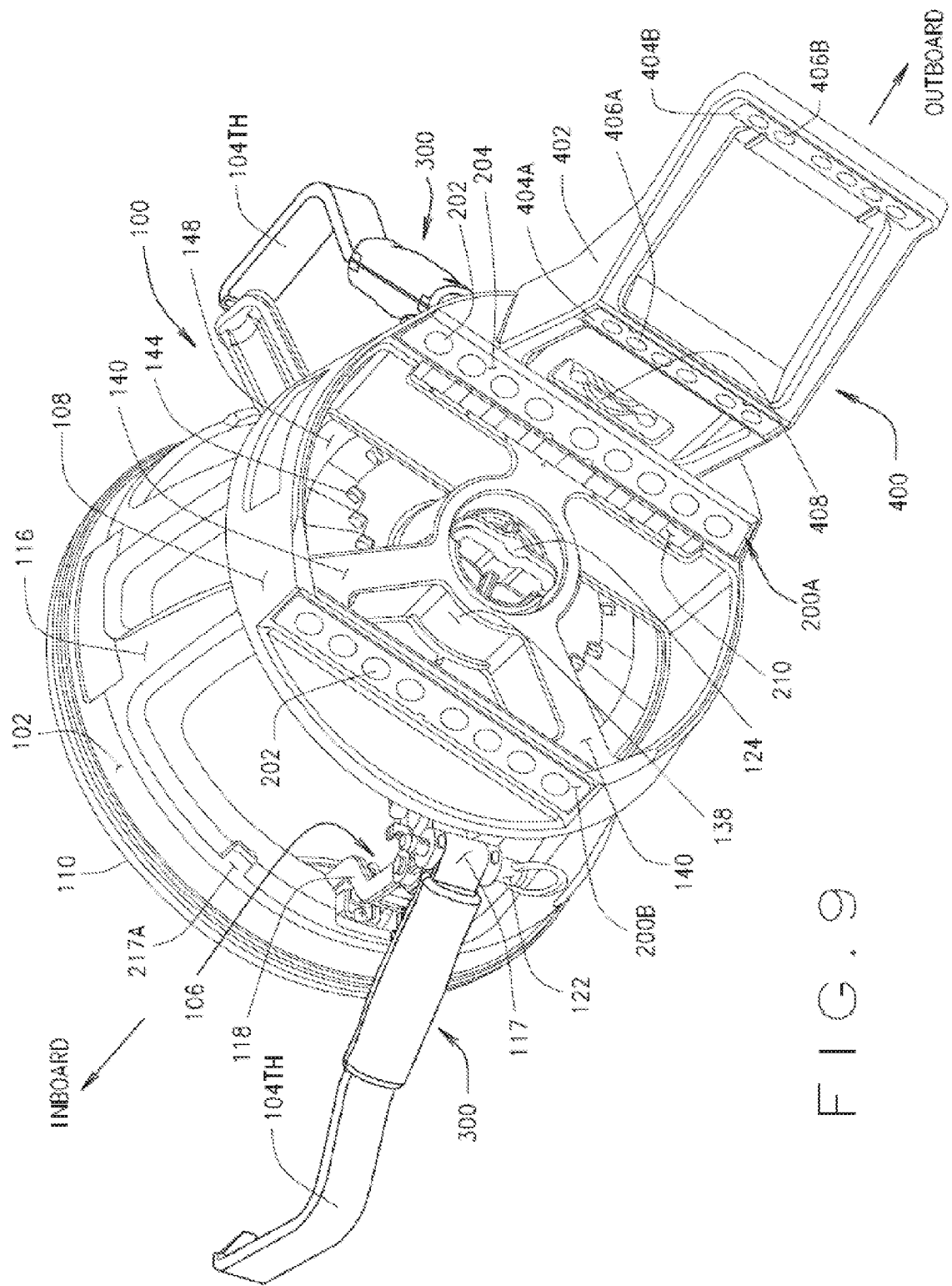
FIG. 9 is a perspective front-left view of the optical target assembly of FIG. 6 with the extended target mounting of FIG. 8 coupled thereto.

As is best shown in FIG. 5, the target support assembly 108 consists generally of an outer annular member 136 coupled to an inner annular member 138 by a plurality of raised connecting webs or struts 140 and planar base surfaces 142 disposed in the recessed regions between the inner and outer annular members. At least one of the planar base surfaces 142 is provided with one or more windows or openings 144, through which markings 146 on the upper surface of the target pivot mount 114 are visible when the target support assembly 108 is disposed in one or more selected rotational positions relative to the target pivot mount 114 (See: FIGS. 1, 6, and 9). Suitable label graphics 148 or other graphics may be provided on the planar base surfaces 142 adjacent the windows or openings 144 to provide a visual indication of the selected rotational position of the target support assembly 108 relative to the target pivot mount 114.

The primary function of the target support assembly 108 is to provide two or more discrete surfaces 200A, 200B on the outer annular member 136, having optical target elements 202 which can be observed by a machine vision measurement system. The optical target elements 202 may be printed elements on appliqué 204 of retro-reflective or high-contrast material, which is suitably affixed or bonded to the surfaces 200A, 200B, or may be applied directly to the discrete surfaces 200.

Those of ordinary skill in the art will readily recognize that the optical target elements 202 may have any of a variety of shapes, configurations, and/or colors as may be suitable for use with the intended observing machine vision measurement system. The optical target elements 202 provide visible features which are identifiable in images acquired by the imaging system associated with a vehicle service device, and provide a sufficient number of data points to enable a determination as to the position and orientation of the optical target surfaces 200 in three-dimensional space from acquired images. For example, the optical target elements 202 may include a set of geometric figures arranged in a predetermined configuration as shown in U.S. Pat. No. 6,134,792 to January, herein incorporated by reference, or simply a set of identifiable fixed features, such as shown in U.S. Pat. No. 6,894,771 to Dorrance et al., herein incorporated by reference.

As is best seen in FIGS. 1 and 6, surfaces 200A and 200B are separate from each other, and aligned to present the associated optical target elements 202 in substantially the same field of view, generally orthogonal to the axis of rotation of the target support assembly. Preferably, one of the target surfaces 200A, 200B is offset from the other in an axial direction, such that one target surface is positioned further away from the contact surface 110. While shown in a generally parallel planar configuration in the Figures, those of ordinary skill in the art will recognize that the surfaces 200A and 200B need not be planar, may be inclined relative to each other, may be curved, or may be defined as separate regions of a smoothly continuous surface.

Figure 7:
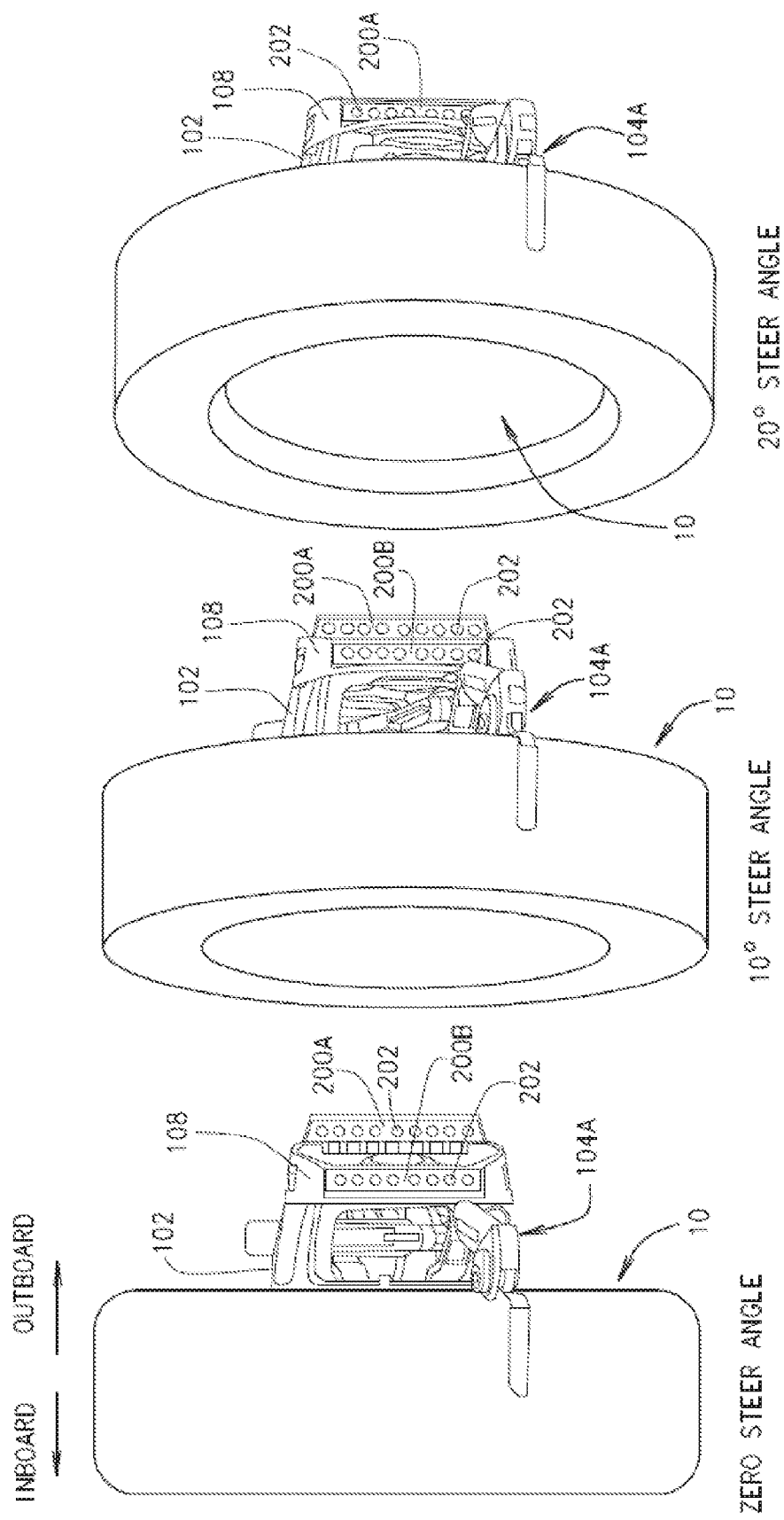
FIGS. 7A-7C illustrate varying visibility of an optical target assembly of FIG. 1 when mounted on a vehicle wheel steered to zero toe, 10 degrees of toe, and 20 degrees of toe, respectively.

In order to minimize the weight of the optical target assembly 100, it is preferable that the target surfaces 200 and optical target elements 202 are positioned on the target support assembly 108 at positions which do not extend axially from the contact surface 110 substantially more than is necessary for the optical target elements 202 to remain visible when viewed from an imaging system having a line of sight parallel to the wheel rim surface (FIG. 7A), and when the wheel assembly is steered outward through an arc of at least 10 degrees, such as over a range from 0 to 20 degrees, as seen in FIGS. 7B and 7C. As the wheel assembly is steered, a line of sight from the imaging system to the target surfaces 200 and optical target elements 202 may become partially or fully blocked by the leading edges of the tire. (FIG. 7C), however, it has been found that at least 10 degrees of steering arc visibility is generally sufficient to enable the imaging system to acquire most necessary wheel alignment angle measurements. Those of ordinary skill in the art will recognize that the optical target assembly 100 may be modified or configured to position the target surfaces 200 and optical target elements 202 at locations which are visible to an imaging system disposed as indicated, through a steering arc which is smaller than, or greater than, the degrees of steering described above without departing from the scope of the present disclosure.

Figure 8:
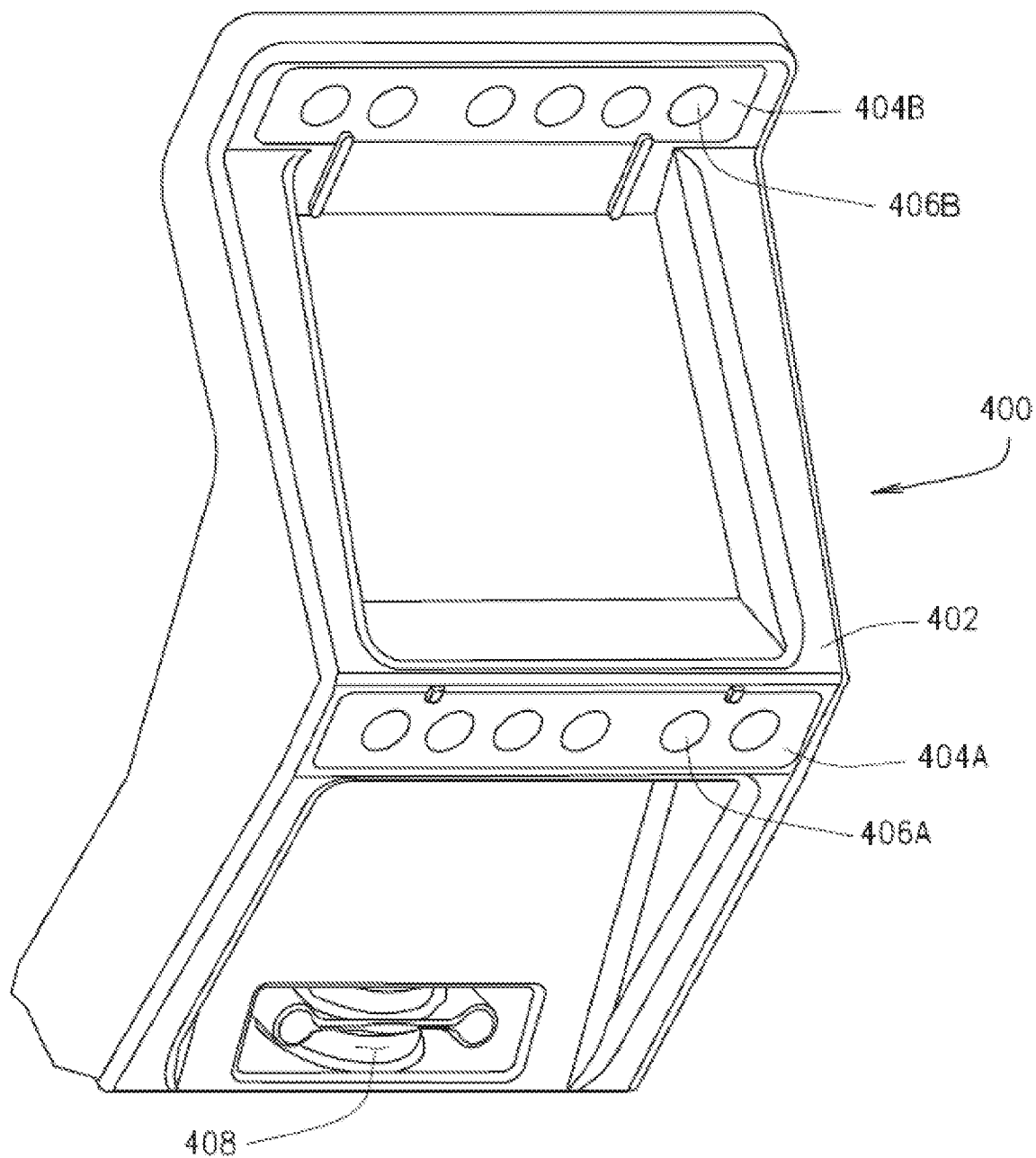
FIG. 8 is a perspective view of an extended target mounting for coupling to the optical target support element of FIG. 5.

Under some circumstances it may be necessary to enable viewing of optical target elements 202 at a steering angle which is greater than 20 degrees, or to displace the optical target elements 202 axially further outward from the contact surfaces 110 to enable viewing around obstructions in the imaging system line of sight. Accordingly, the target support assembly 108 is provided with an extended target mounting 212, onto which a removable target structure 400, shown in FIGS. 8 and 9, may be temporarily secured in a position which is axially outward from the target surfaces 200 incorporated into the target support assembly 108. The extended target mounting 212 is preferably a magnetic plate, as seen in FIG. 5, configured to magnetically secure a corresponding magnetic base of the removable target structure 400, but those of ordinary skill in the art will recognize that any of a variety of suitable mounting means may be employed, including mechanical engagements, threaded connectors, clips, etc., provided that the removable target structure 400 is removably secured in a substantially stable relationship to the target support assembly 108. Preferably, the removable target structure consists of a rigid body 402, and includes two separate target surfaces 404A and 404B, on which are disposed associated target elements 406A and 406B. The target elements 406A and 406B on the removable target structure 400 function identically to the optical target elements 202 on the target support assembly 108, but are axially displaced further outward from the vehicle wheel assembly, and therefore remain visible to an imaging system over a wider range of steering angles for the vehicle wheel assembly.

When employing non-planar optical targets having identifiable optical target elements 202 that are not precisely known or predetermined, methods such as described by U.S. Pat. No. 6,894,771 to Dorrance et al. may be utilized by an observing measurement system to compute the three-dimensional location of the optical target elements 202 in relation to each other, in order to use the target with a vehicle wheel alignment system. Using these methods, the locations of the optical target elements 202 can be determined each time the vehicle wheels are compensated. However, if the target support assembly 108 is dimensionally stable, and the optical target elements 202 or 406 are fixed to the target, it is not necessary and computationally expensive to repeatedly determine the locations of the optical target elements 202 relative to each other. It is much more efficient to compute, or characterize, the relationships of the optical target elements 202, 406 once when the system is installed, and then use those computed relationships whenever the same optical target assembly 100 is used by the system.

A machine vision vehicle wheel alignment system employs a single optical target assembly 100 at each wheel assembly or rim 10, and there can be a number of different alignment systems in use at one vehicle service location. Hence, there can be a large number of optical target assemblies 100 in use at a single vehicle service location. A target identification method for use by the vehicle wheel alignment measurement system is required in order to be able to identify each observed optical target assembly 100 to permit the correct stored target characterization data to be employed by a suitably configured processing system when evaluating acquired images of the optical targets. Preferably, the target support assembly 108 incorporates visible identifying markings or indicia, such as a row of retro-reflective squares 210A in a known relationship to at least one of the optical target features 202, which can be identified in images of the target support assembly acquired by an observing imaging system. A unique identification pattern for each target support assembly 108 can be provided by covering one or more of the reflective squares 210A with something such as a black adhesive square 210B or another suitable indicia 210C.

Those of ordinary skill in the art will recognize that there are many possible schemes for providing for a target identification pattern. For example, one scheme would be to treat the identification pattern like binary digits, where a visible square 210A would be a binary "1" and a covered square 210B would be a binary "0". In this scheme each target assembly 108 would have a unique binary coded number that would be used by the associated processing system to access target characterization data. Another scheme would be to assign four of the squares to represent a wheel position where target will be used. The square that's covered will indicate which wheel position (left front, right front, left rear or right rear) the target assembly 108 is assigned to, ensuring the same target assembly 108 is utilized at the same location for each vehicle wheel alignment measurement procedure. Other visible or occluded squares can similarly be used to indicate which service bay the target assembly 108 is being used. In this way the target assembly 108 would be identified to an observing processing system by both vehicle wheel position and vehicle service bay.

During use, an optical target assembly 100 of the present disclosure is placed with the contact surface 110 (110A) in a non-determined position against an outboard surface of a vehicle wheel assembly, generally between the center hub and wheel rim lip, such that the optical target elements 202 associated with the target assembly 108 are orientated generally for viewing by one or more imaging sensors. To hold the contact surface 110 in engagement with a generally vertical surface of a vehicle wheel rim 10, as shown in FIG. 11A, the opposed wheel clamp arms 104A and 104B, 300, coupled to the tension and locking mechanism 106 mounted to the base assembly 102, are positioned to engage the treads of the associated tire. Each wheel clamp arm 104 includes a tire hook 104TH configured to grip a tire tread surface of a vehicle wheel 12, which may be pivotally coupled to the wheel clamp arms as seen in FIG. 1, or which may be fixed relative to the wheel clamp arms as seen in FIG. 6. Each opposed wheel clamp arm 104 is adjustable in multiple dimensions to accommodate wheel assemblies of different dimensions, while wheel clamp arms 300 are of a fixed configuration, and instead rely upon the adjustments to the locking and clamping mechanism to accommodate wheel assemblies of different dimensions.

For extremely deep wheel rims, a base extender ring 216 shown in FIG. 2, having an axial thickness may be fitted to the contact surface 110 prior to placement against the outboard surface of the vehicle wheel assembly, providing increased axial length to the optical target assembly sufficient to ensure the optical target elements 202 are visible to an associated imaging system. The base extender ring 216 essentially provides a second contact surface 110A, which is identical to contact surface 110, and may be secured to the base assembly 102 by any suitable means, such as rubber catches 217 configured to engage corresponding tabs 217A on the base assembly 102.

Those of ordinary skill in the art will recognize that any of a variety of mechanical components may be utilized to achieve the desired range of movement for the wheel clamp arms 104, including, but not limited to, sliding assemblies, threaded assemblies, pivoting assemblies, and expanding assemblies. It is not required that the wheel clamp arms 104 be adjusted synchronously, or that they be disposed in mirror-image configurations, provided the wheel clamp arms 104 are sufficiently positioned to engage the tire tread surfaces of a vehicle wheel to secure the contact surface 110 of the base assembly 102 against the surfaces of the wheel rim 10 between the circumferential lip and the axial center point, in a stationary and stable manner during wheel alignment angle measurements and procedures.

The optical target assembly 100 is held against the vehicle wheel assembly by forces exerted between the wheel clamp arms 104, 300 from the tension and locking mechanism 106. These forces pull the optical target assembly 100 against the vehicle wheel assembly surface using the tire hooks 104TH. The geometry of the entire assembly transfers the load from the tension and locking mechanism 106 to the tire hooks 104TH and in turn creates a force pulling the optical target adapter 100 firmly against the surface of the wheel assembly.

Those of ordinary skill in the art will recognize that the tension and locking mechanism 106 may have a variety of different configurations suitable for exerting forces on the wheel clamp arms 104, 300 and other components of the optical target assembly 100 to achieve the effect of providing a clamping force to hold the optical target assembly 100 to a vehicle wheel rim surface. For example, threaded screw components, or resilient elastic components may be utilized in place of spring-biased mechanisms, and/or the geometric configuration of the various components may be varied to produce different forces and moments which achieve the desired effect of clamping the optical target assembly 100 securely in place.

Once the optical target assembly 100 is secured, the target support assembly 108 is rotationally adjusted to align the target surfaces 200 for optimal viewing from the location of the imaging sensors associated with the machine vision measurement system when the vehicle is disposed at an alignment service position. During a vehicle wheel alignment service procedure, it is necessary to observe the relationship between the mounted targets and the wheel assemblies upon which they are secured. This is typically done by mounting the target assemblies to the vehicle wheels, and rolling the vehicle a short distance to acquire images of the mounted targets at different rotational positions of the wheel vehicle wheels. Some rolling procedures require that the vehicle be rolled forward only, while others require that the vehicle be rolled forward and returned to the initial position. Accordingly, to ensure optimal viewing, the target support assemblies are rotationally adjusted at the time of mounting for optimal viewing at either the subsequent roll-forward position of the vehicle wheels or at the initial position of the vehicle wheels, depending upon the particular procedure to be utilized.

The rotational adjustments may be accomplished by loosening the retainer 124, rotating the target support assembly 108 to a desired rotational position, and then re-tightening the retainer 124 to secured the target support assembly. Predetermined rotational positions, such as may be associated with placement on a front vehicle wheel or a rear vehicle wheel, may be identified by aligning markings on the labels 148 with marking visible through the windows 144 in the target support assembly 108. Generally, with an imaging system disposed at an elevated position adjacent the front of the vehicle, the target support assemblies 108 mounted to the front wheels of the vehicle will be required to have a greater degree of rotation relative to those mounted to the rear wheels of the vehicle.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An optical target assembly adapted to secure a set of optical target elements relative to a vehicle wheel assembly consisting of a wheel rim and a tire mounted thereon, comprising:
   a base assembly configured for non-determined abutting placement against an outer surface of the vehicle wheel assembly;
   a target support assembly secured to said base assembly, said target support assembly incorporating at least two separated target surfaces on which said optical target elements are disposed;
   wherein said base assembly includes at least two wheel clamp arms; and
   wherein each of said wheel clamp arms configured for engagement with said outer surface of the vehicle wheel assembly at a tire surface to maintain said base assembly in said abutting placement against said outer surface of the vehicle wheel assembly.

2. The optical target support assembly of claim 1 wherein each of said wheel clamp arms are further configured to maintain said assembly immobile relative to said outer surface of the vehicle wheel assembly.

3. The optical target support assembly of claim 1 wherein each of said wheel clamp arms is longitudinally adjustable to accommodate vehicle wheel assemblies of different sizes.

4. The optical target support assembly of claim 1 wherein said at least two separated target surfaces are aligned in a common direction for presentation in a common field of view.

5. An optical target support assembly configured to secure an optical target relative to a vehicle wheel assembly consisting of a wheel rim having a tire mounted thereon, comprising:
- a base assembly;
  - wherein said base assembly includes at least one attachment mechanism configured to maintain said base assembly immobile relative to an outer surface of the wheel assembly during rolling movement of the vehicle wheel associated with a vehicle service procedure; and
  - an optical target secured to said base assembly in a non-determined relation to the wheel rim.

6. The optical target support assembly of claim 5 wherein said at least one attachment mechanism includes at least two wheel clamp arms, each of said wheel clamp arms terminating at an associated distal end for engagement with said vehicle wheel assembly outer surface to maintain said assembly immobile relative to said outer surface of the vehicle wheel assembly.

7. The optical target support assembly of claim 6 wherein each of said wheel clamp arms is longitudinally adjustable.

8. The optical target support assembly of claim 5 wherein said optical target defines at least two separated target surfaces on which a plurality of optical target elements are disposed.

9. The optical target support assembly of claim 8 wherein said first and second separated target surfaces are aligned in a common direction for presentation in a common field of view.

10. A machine-vision vehicle wheel alignment measurement system for acquiring a set of measurements associated with the position and orientation of one or more wheel assemblies of a motor vehicle, comprising:
- a set of optical target assemblies each configured for non-determined placement against a surface of a vehicle wheel assembly and supporting a set of optical targets, each of said optical target assemblies associated with a target identifying characteristic which is unique within said set of optical target assemblies;
- an imaging system positioned to acquire images of the optical targets secured to said set of optical target assemblies and said target identifying characteristic when said optical target assemblies are placed on the wheel assemblies of a motor vehicle undergoing service;
- a processing system coupled to said imaging system, said processing system configured with software instructions to process said acquired images from said imaging system together with said target identifying characteristics to recall characterization data associated with each of said uniquely identified optical target assemblies.

11. The machine-vision vehicle wheel alignment system of claim 10 wherein said characterization data identifies one or more relationships between a plurality of optical target elements defining said associated optical targets secured to said optical target assemblies.

12. The machine-vision vehicle wheel alignment system of claim 11 wherein said target characterization data includes established relationships between said plurality of optical target elements.

13. The machine-vision vehicle wheel alignment system of claim 10 wherein said target identifying characteristics include identification of mounting locations for the optical target assemblies.

* * * * *